US006744227B2

United States Patent
Kataoka

(10) Patent No.: US 6,744,227 B2
(45) Date of Patent: Jun. 1, 2004

(54) VIBRATION TYPE ACTUATOR APPARATUS

(75) Inventor: Kenichi Kataoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/241,595

(22) Filed: Sep. 12, 2002

(65) Prior Publication Data

US 2003/0052628 A1 Mar. 20, 2003

(30) Foreign Application Priority Data

Sep. 19, 2001 (JP) ......................... 2001-285269

(51) Int. Cl.$^7$ ............................................... H02K 33/00
(52) U.S. Cl. .................. 318/114; 318/122; 318/123
(58) Field of Search ........................... 310/51, 316.01, 310/316.02; 318/114, 122, 123, 126, 128, 129, 134

(56) References Cited

U.S. PATENT DOCUMENTS

| | | | | |
|---|---|---|---|---|
| 5,361,303 A | * | 11/1994 | Eatwell | 381/71.9 |
| 5,703,446 A | * | 12/1997 | Doan | 318/119 |
| 6,020,673 A | * | 2/2000 | Matsumoto | 310/316.02 |
| 6,215,224 B1 | | 4/2001 | Kataoka et al. | 310/316.02 |
| 6,229,402 B1 | | 5/2001 | Kataoka et al. | 331/34 |
| 6,400,107 B1 | * | 6/2002 | Nakatani et al. | 318/254 |
| 6,469,417 B2 | * | 10/2002 | Shibatani | 310/316.01 |

FOREIGN PATENT DOCUMENTS

JP  6-197566  7/1994

* cited by examiner

*Primary Examiner*—Karl Tamai
*Assistant Examiner*—Judson H. Jones
(74) *Attorney, Agent, or Firm*—Fitzpatrick, Cella, Harper & Scinto

(57) ABSTRACT

The present invention relates to a vibration type actuator apparatus, and is aimed to provide an apparatus capable of determining a phase with which a driving voltage is applied to a piezo-electric member particularly relative to a phase of vibration displacement of a vibration member, shifting to a high-speed driving state in a short time, and abruptly stopping.

14 Claims, 10 Drawing Sheets

VIBRATION TYPE ACTUATOR APPARATUS

BACKGROUND OF THE INVENTION

1. Field of the Invention

The present invention relates to a control unit which performs position control or speed control through a use of a vibration type actuator.

2. Related Background Art

Generally, a vibration type actuator has a vibration member to be composed of an elastic member and a piezo-electric element as an electro-mechanical energy conversion element, and to the elastic member, the piezo-electric element has been bonded or bonded compressively at a position having a phase difference of 90° each other in space, and a two-phase alternating signal having a phase difference is applied to the piezo-electric element, whereby a traveling wave is caused to be generated on the elastic member, a contact member (movable member) is brought into close contact with this traveling wave, and by a frictional force, the contact member is caused to relatively move to the vibration member. In this respect, onto a contact portion between the elastic member and the contact member, friction material for obtaining an appropriate frictional force is bonded, coated or formed.

As regards drive control of such a vibration type actuator, there have been proposed a system for controlling a driving frequency, a system for controlling the driving voltage, and a system for controlling a phase of the above-described two-phase alternating signal, and as disclosed in, for example, Japanese Patent Application Laid-Open No. 06-197566, there has been a system in which the frequency is controlled such that a phase difference between a vibration detection signal obtained at an element portion for vibration detection provided on the piezo-electric element and applied voltage which is one alternating signal for driving to be applied to the drive unit of the piezo-electric element becomes a predetermined value.

In such a control system, since the frequency of driving voltage has been set in response to a phase difference between the vibration detection signal and the applied voltage, the response is slow and it is not possible to improve response of vibration within a time period of one period or half period level of the driving voltage. Therefore, acceleration and deceleration thereof are slow and such system is vulnerable to abrupt load fluctuation, and when the driving frequency is in the vicinity of a resonance frequency, an abrupt stop may occur.

SUMMARY OF THE INVENTION

The present invention solves such conventional problems and provides a control unit for a vibration wave actuator for enabling quick-response and reliable control.

According to one aspect of the present invention, there is provided a vibration type actuator apparatus which excites a vibration member to obtain a driving force by applying each of plural phases of driving volage to respective different electro-mechanical energy conversion element portions for driving respectively, including: a detection circuit for forming a signal which indicates a periodic change in response to a vibration state of the vibration member; and a control circuit which controls timing in applying the driving voltage to the energy conversion element portion on the basis of timing of a periodic change in a detection output signal of the detection circuit concerned.

According to one aspect of the present invention, there is provided a vibration type actuator apparatus which excites a vibration member to obtain a driving force by applying each of plural phases of driving volage to respective different electro-mechanical energy conversion element portions for driving respectively, comprising: a detection circuit which detects vibration of the vibration member to form a signal having waveform corresponding to the vibration displacement; and a control circuit which applies the driving voltage to the energy conversion element portion with a phase shifted by a predetermined phase from signal waveform from the detection circuit concerned.

According to one aspect of the present invention, there is provided a vibration type actuator apparatus which excites a vibration member to obtain a driving force by applying each of plural phases of driving volage to respective different electro-mechanical energy conversion element portions for driving respectively, comprising a circuit which determines timing with which the vibration member is excited in accordance with timing of vibration displacement of the vibration member.

According to one aspect of the present invention, there is provided a method of driving a vibration type actuator apparatus which excites a vibration member to obtain a driving force by applying each of plural phases of driving volage to respective different electro-mechanical energy conversion element portions for driving respectively, including the steps of: detecting vibration of the vibration member to form a signal indicating a periodic change in response to a state of vibration; and controlling timing in applying the driving voltage to the energy conversion element portion on the basis of timing of a periodic change of the signal concerned.

According to one aspect of the present invention, there is provided a method of driving a vibration type actuator apparatus which excites a vibration member to obtain a driving force by applying each of plural phases of driving volage to respective different electro-mechanical energy conversion element portions for driving respectively, including the step of: determining timing with which the vibration member is excited in accordance with timing of vibration displacement of the vibration member.

Other objects of the present invention will become more apparent from the following description of embodiments taken in conjunction with the accompanying drawings.

DETAILED DESCRIPTION OF THE PREFERRED EMBODIMENTS (First Embodiment)

Figure 1:
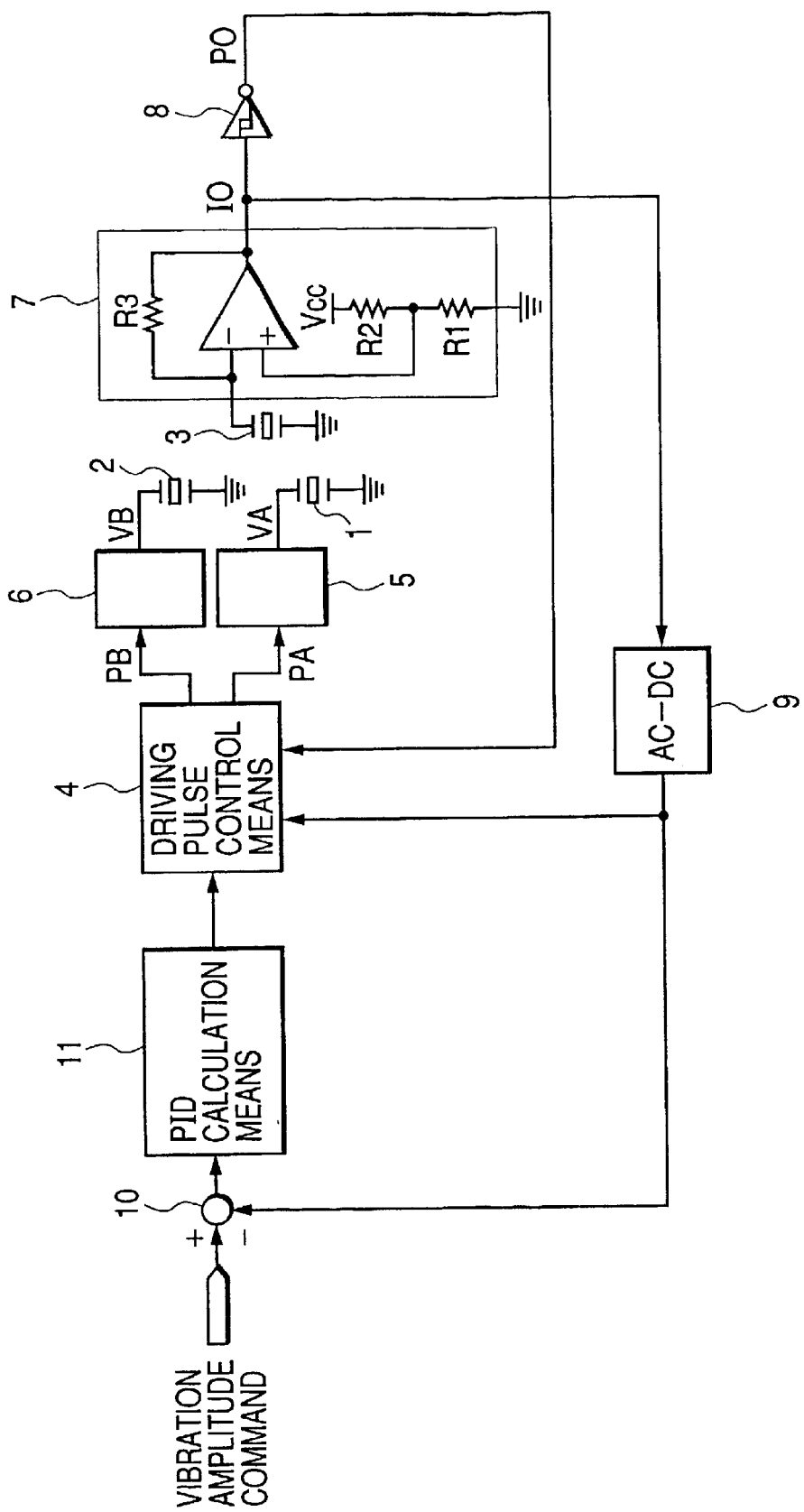
FIG. 1 is a block diagram showing a first embodiment.

FIG. 1 is a block diagram showing a control unit for a vibration type actuator according to a first embodiment.

In FIG. 1, reference numerals 1 and 2 denote a piezo-electric element as an electro-mechanical energy conversion element provided for driving, constituting a vibration member in a vibration type actuator, and the vibration type actuator is constructed such that by applying AC voltage to the piezo-electric element, two standing vibrations are caused to occur in an elastic member (not shown), and a contact member (movable member)(not shown) to be press-contacted with the elastic member and the vibration member are caused to relatively move to each other. The vibration member is, for example, constructed such that a piezo-electric element formed in an annular shape is bonded and fixed to one side of a metallic elastic member formed in an annular shape through the use of adhesive.

The configuration is arranged such that to a piezo-electric element 1 and a piezo-electric element 2, AC voltage 90° out of time phase each other is applied, and vibration 90° out of phase is caused to occur in the elastic member and to cause a traveling vibration wave to occur on the elastic member.

Reference numeral 3 denotes a piezo-electric element for detecting vibration of the vibration member, which is arranged in the elastic member so as to detect standing vibration to be formed on the elastic member by applying AC voltage to the piezo-electric element 1. Reference numeral 4 denotes driving pulse control means which generates an AC signal (pulse signal) for driving the vibration type actuator, which outputs two-phase 90° out of phase pulse signals at a predetermined period during driving before vibration amplitude of the vibration member exceeds a predetermined value.

Reference numeral 5 or 6 denotes a half-bridge circuit which converts the two-phase pulse signals into waveform of voltage amplitude for driving the vibration type actuator respectively, which applies voltage of several tens V to the piezo-electric elements 1 and 2 respectively in response to the voltages from respective power source means (not shown).

Reference numeral 7 denotes a current detection amplifier which detects output current from the piezo-electric element 3 for detecting vibration of the vibration member, which outputs waveform proportionate to the vibration speed of a material particle of the vibration member. As the amplitude of vibration speed is also proportionate to the vibration amplitude of vibration to be formed on the elastic member, this is also utilized as vibration amplitude. Also, the output from the current detection amplifier 7 is structured so as to superimpose a predetermined offset voltage.

Reference numeral 8 denotes a Schmitt trigger-input inverter for converting a vibration speed signal into a pulse signal, which detects phase information on the vibration speed.

Reference numeral 9 denotes AC-DC conversion means for detecting the amplitude of a vibration speed signal, which detects the vibration amplitude of the vibration member.

Reference numeral 10 denotes comparison means for comparing a vibration amplitude signal which is an output signal from the AC-DC conversion means 9 with a vibration amplitude command from command means (not shown); and 11, PID calculation means for PID-calculating the comparison result of the comparison means 10 to output to the driving pulse control means.

Here, a brief description concerning characteristics of an output signal from the current detection amplifier 7 is given. A signal to be detected by the piezo-electric element 3 for vibration detection represents, of vibrations to be excited on an elastic member (not shown), a state of standing vibration formed on the elastic member excited by the piezo-electric element 1. This standing vibration causes strains on a surface attached with the piezo-electric element 3 to cause electric charge proportionate to an amount of the strains on the electrode of the piezo-electric element 3. This amount of strains corresponds to vibration amplitude of a vibration member (not shown), and if voltage waveform is taken out as normal output from the piezo-electric element 3, as the result of electric charge proportionate to the amount of strains being charged to an equivalent capacity of the piezo-electric element 3, it will be possible to take out a vibration displacement signal of standing vibration excited by excitation of the piezo-electric element 1.

In the present embodiment, however, current to be outputted from the piezo-electric element 3 for vibration detection is detected by the current detection amplifier 7. For this reason, the output voltage from the piezo-electric element 3 is fixed to predetermined DC voltage to be determined by resistances R1, R2 and supply voltage Vcc through the use of the current detection amplifier 7, and current based on electric charge generated by the piezo-electric element 3 is converted to voltage at an amplification factor to be determined by resistance R3 for output. Thereby, a signal corresponding to a change in strains resulting from the standing vibration is adapted to be detected. Accordingly, a signal whose phase is advanced by 90° relative to a case where output from the piezo-electric element 3 is detected as voltage is detected, and its amplitude becomes a value corresponding to the amplitude of the standing vibration.

Figure 8:
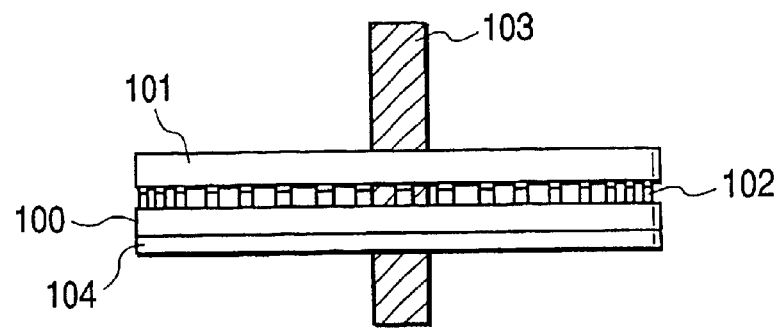
FIG. 8 is a schematic view showing an example of a vibration type actuator.

Such a vibration type actuator is shown in FIG. 8.

Figure 9:
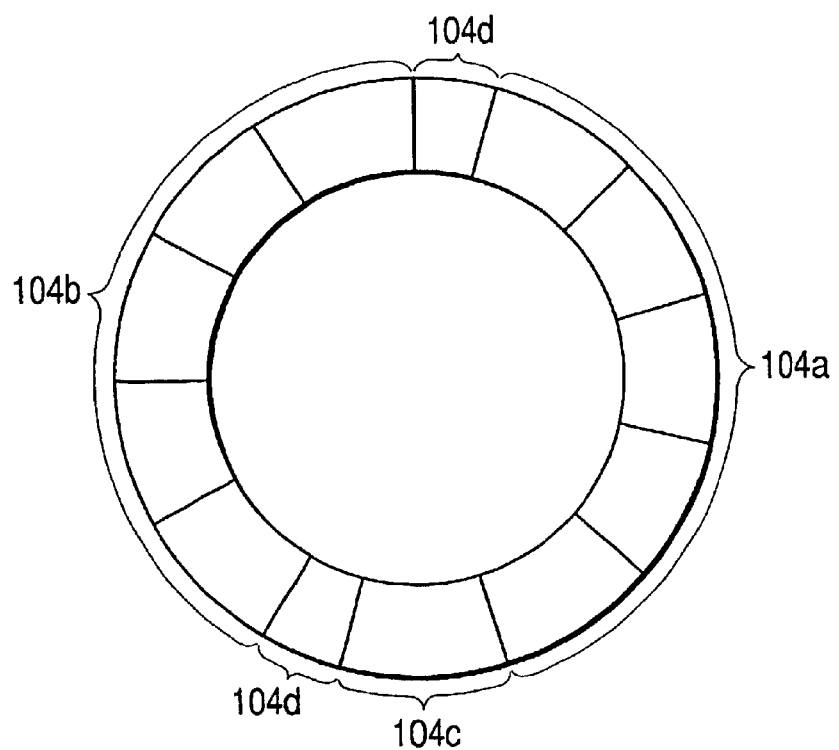
FIG. 9 is a view showing an electrode structure of a piezo-electric element of the vibration type actuator.

In FIG. 8, reference numeral 100 denotes an elastic member composed of a plurality of elastic members formed by metallic material; 101, a rotor brought into contact with the elastic member 100 under pressure by pressing means (not shown); 102, frictional material bonded to the elastic member 100, and interposed between it and the rotor 101; 103, a rotating shaft connected to the center of the rotor; and 104, a piezo-electric body bonded to the elastic member 100. The piezo-electric body 104 is formed in an annular shape shown in FIG. 9, and the surface thereof is divided into a plurality of electrodes. Also, when the wavelength at resonance frequency is assumed to be $\lambda$, this electrode is arranged at intervals of $(¼)\lambda$, and is composed of: two driving electrode groups (104a, 104b) having an interval between each electrode being $(½)\lambda$; and one sensor electrode portion (104c). The group 104a is referred to as A-phase, the group 104b is referred to as B-phase, and electrode portion 104c is referred to as S-phase, is piezo-electric element for vibration detection. 104d denotes an idle electrode having an interval of $(¼)\lambda$, and this is normally connected to GND. The S-phase 104c is arranged so as to detect vibration of A-phase, and has an interval of $(½)\lambda$. In the electrode groups 104a and 104b for A-phase and B-phase driving, electrodes having different polarization directions respectively are alternately arranged.

The vibration type actuator shown in FIG. 8 is constructed such that AC voltage having a temporal phase 90° different from each other are applied to these A-phase and B-phase, whereby a traveling vibration wave is caused in the elastic member 100, the force of this vibration is transmitted to the rotor 101 brought into contact with the elastic member 100 through the frictional material 102 under pressure through the frictional force to rotate the rotor 101. As described above, in the vibration type actuator, two AC voltage are applied, whereby the rotor 101 and a vibration member having the elastic member 100 and the piezo-electric element 104 are to rotate relative to each other.

With reference to FIG. 1, the description will be made of an operation of controlling the vibration amplitude of a vibration member (not shown) to desired amplitude in the shortest time and subsequently stopping the vibration in the shortest time. First, the description will be made of a case of controlling to the desired amplitude in the shortest time.

In order to excite such that the vibration amplitude becomes large in the shortest time, the excitation force can be given with a phase advanced by 90° from the vibration displacement. Thus, by taking advantage of the fact that the output signal (current) from the current detection means 7 is a signal whose phase is delayed by 90° from the vibration displacement of the standing vibration when excited by the piezo-electric element 1, excitation will be performed. In this respect, since the amplifier 7 according to the present embodiment is an inversion input amplifier, the phase is delayed by 90° from the vibration displacement as described above, but when a non-inversion input amplifier is used, the phase is advanced by 90°.

The driving pulse control means 4 detects phase information on this signal from an output signal from the inverter 8, and this signal phase changes timing of output pulse in response to an output signal from the PID calculation means 11 to supply pulse voltage to the piezo-electric element 1 through one half-bridge circuit 5. As the output from the inverter 8, the signal becomes a signal whose phase is advanced by 90° from the vibration displacement.

The description will be made of an operation at the time of starting. As regards the output from the PID calculation means 11, since an actual amplitude in the vibration member is 0 in early stages during starting, the output from the AC-DC conversion means 9 is 0. Accordingly, when compared with the desired vibration amplitude (vibration amplitude command) by the comparison means 10, the output signal from the PID calculation means 11 will become larger.

In this case, in the driving pulse control means 4, a time period corresponding to a value obtained by subtracting a value corresponding to predetermined time T1 from the output from the PID calculation means 11 will be calculated, and if this calculation result is negative, a signal with a phase lagged by this time period from a phase (A–A') of an output signal from the inverter 8 will be generated. However, if the result obtained by subtracting the predetermined time T1 is positive, the output signal from the inverter 8 will be outputted as it is.

Accordingly, at the time of starting, since a difference between the target vibration amplitude and actual vibration amplitude is large, the result obtained by subtracting a value corresponding to the predetermined time period T1 becomes a positive value, excitation is performed with a phase of the output signal from the inverter 8, and the vibration amplitude will increase at high speed.

Next, when an output signal from the AC-DC conversion means 9 is brought close to the desired vibration amplitude, the output signal from the PID calculation means 11 becomes smaller, a result obtained by subtracting the predetermined time period T1 becomes a negative value, a signal which is delayed by a time period corresponding to the magnitude of this negative value from the phase of the output signal from the inverter 8 is outputted to the half-bridge circuit 5. Thus, as the desired vibration amplitude is approached, a ratio of increase in the vibration amplitude lowers, and finally the vibration amplitude is controlled to reach the desired vibration amplitude. If an optimum value is selected for a calculation parameter of the PID calculation means 11, the vibration amplitude will be controlled in a short time to be the desired vibration amplitude.

Next, with reference to the timing chart shown in FIG. 2, the description will be made of an operation when the vibration amplitude is set to 0 from this state in a short time.

First, in order to reduce the vibration amplitude in a short time, the excitation force can be delayed by 90° from the vibration displacement. Therefore, if of signal edges of output signals from the inverter 8, the next signal edge (B–B') of the edge of the signal whose phase advances by 90° is used, a signal whose phase is delayed by 90° will be able to be obtained. Taking advantage of this, the structure is arranged such that a limit for an amount of delayed phase is set to the signal edge of the inverter 8 by driving pulse control means 4 so as not to delay the signal phase 90° or more.

In this case, when the vibration amplitude command is set to 0 from a state in which vibrations are given with the desired vibration amplitude, an output signal from the comparison means 10 becomes a negative value. Then, the output from the PID calculation means 11 becomes smaller, a result obtained by subtracting a value corresponding to the predetermined time period T1 becomes smaller, and the phase of an output signal from the driving pulse control means 4 will be delayed from the phase of the output signal from the inverter 8. Soon the phase will be delayed up to B–B' of the output signal from the inverter 8, which is the limit for the delayed amount. Thus, there will be performed excitation whose phase is delayed by 90° from the phase of vibration displacement of the standing vibration, and the vibration amplitude will abruptly become smaller.

This operation will be performed until the output from the AC-DC conversion means 9 reaches a predetermined amplitude or less, and finally, the vibration amplitude approaches to 0. As regards the A–A' and B–B' described above, a limit for a signal PA on a phase lead side is called "A–A'", and a limit on the lag side is called "B–B'". As described above, a pulse edge of the signal PA is controlled in terms of temporal shift each time between A–A' and B–B'.

Also, to the piezo-electric element 2, a signal generated on the basis of a signal whose phase has been delayed by T1 from pulse voltage to be applied to the piezo-electric element 1 is applied, and in accordance with a moving direction of a movable member which is press-contacted to a vibration type actuator (not shown), it is judged whether or not a signal whose phase is delayed by the time period T1 is reversed. Therefore, the amplitude of standing vibration to be excited by the piezo-electric element 2 is also to be increased or attenuated in the same manner as the standing vibration to be excited by the piezo-electric element 1 as described above.

Figure 2:
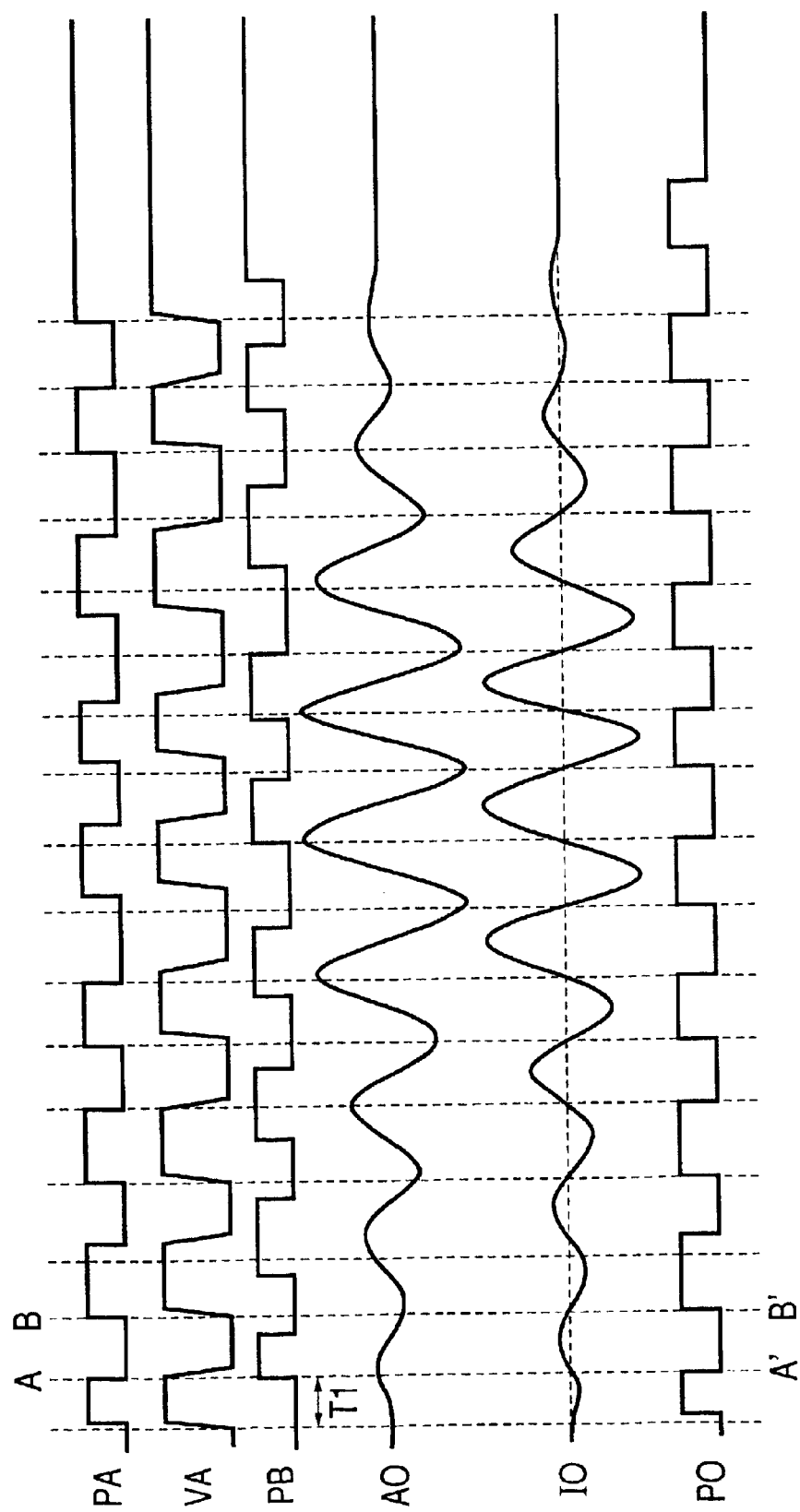
FIG. 2 is a timing chart showing waveform in each portion of the first embodiment.

FIG. 2 is a timing chart showing signal waveform for each portion.

An output IO from the current detection amplifier 7 is obtained (whose phase is delayed by 90°) by reversing a signal whose phase is advanced by 90° from a vibration amplitude displacement AO of standing vibrations to be excited by the piezo-electric element 1 of a vibration member (not shown). Also, on an output signal from the current detection amplifier 7, a DC offset portion is superimposed, and the phase of AC signal of an output signal from the current detection amplifier 7 is adapted to be able to be detected by the inverter 8. PO is an output signal from the inverter 8, and is a pulse signal obtained by reversing the phase of the output signal from the current detection amplifier 7.

Signals PA and PB are output signals from the pulse control means 4, the output signal PB is a signal whose phase is delayed by time T1 from the output signal PA, and the time T1 is determined to correspond to a phase difference of nearly 90°.

VA is a signal (alternating signal to be applied to the piezo-electric element 1) obtained by amplifying the output signal PA by the half-bridge 5. In the initial stage of starting up, it can be seen that the output signal PA is substantially in synchronism with the output signal PO from the inverter 8. This is because the target amplitude is larger than actual amplitude, and does not become negative even though a value corresponding to the predetermined time period T1 is subtracted from the output from the PID calculation means 11 and therefore, a phase delay for the output signal PO is 0. For this reason, excitation with a phase which is advanced by nearly 90° from the vibration displacement of a vibration member (not shown) is performed, whereby the vibration amplitude is adapted to be increased in a short time to reach the target vibration amplitude in the shortest time.

When the target amplitude is approached, a result obtained by subtracting a value corresponding to the predetermined time period T1 from the output from the PID calculation means 11 becomes a negative value, the phase of the signal PA is delayed from the output signal PO from the inverter 8, and the vibration amplitude is controlled by the target amplitude.

Also, on setting the vibration amplitude to 0, the phase is further delayed, reaches a limit on amount of delay, and finally the signal PA has waveform obtained by substantially reversing the signal PO.

Also, when the vibration amplitude has become smaller than the predetermined amplitude at this time, the signal levels of the signal PA and the signal PB are fixed (both on high level in the present embodiment), and thereafter, are adapted not to be excited. This is because when the vibration amplitude becomes small, even if excitation is performed with timing to attenuate the vibration, the attenuation may be overshot to conversely increase the vibration.

In this respect, in the present embodiment, the vibration amplitude has been controlled by delaying the phase of the signal PA from the phase of the signal PO of the inverter 8, but even though the operation of the pulse control means 4 of FIG. 1 is changed to advance the phase, the same control can be performed. This is realized by reversing the signal PO to define it as a signal nPO, and controlling in the form of delaying this. For example, in order to advance the phase of the driving voltage by 30° from the vibration displacement of an elastic member, it takes the form of delaying by 150° from a signal nPO whose phase is advanced by 180° by reversing the signal PO. Circuit configuration of this variation is shown in a block diagram of FIG. 3.

Figure 3:
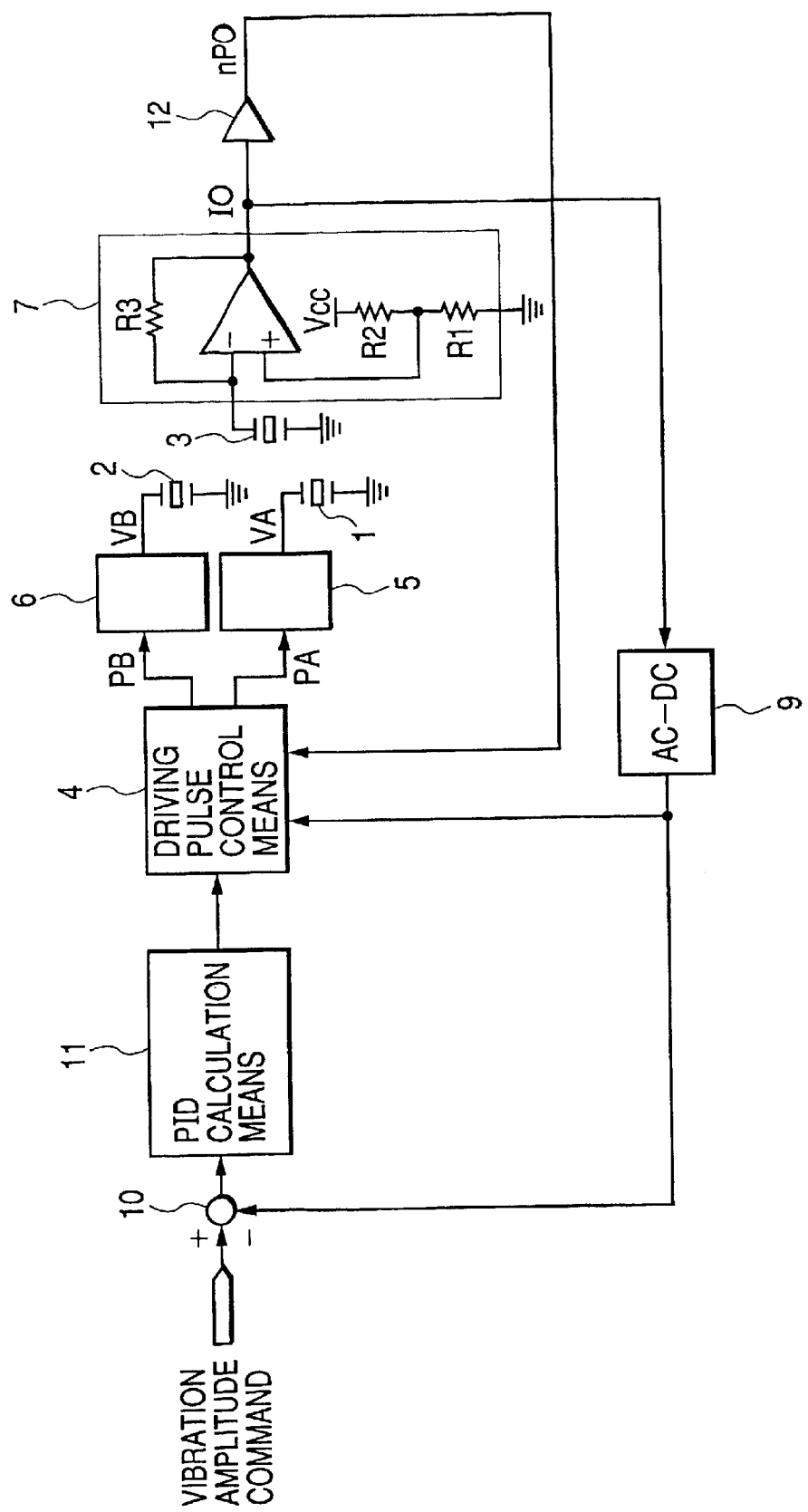
FIG. 3 is a block diagram showing a variation of the first embodiment.
Figure 4:
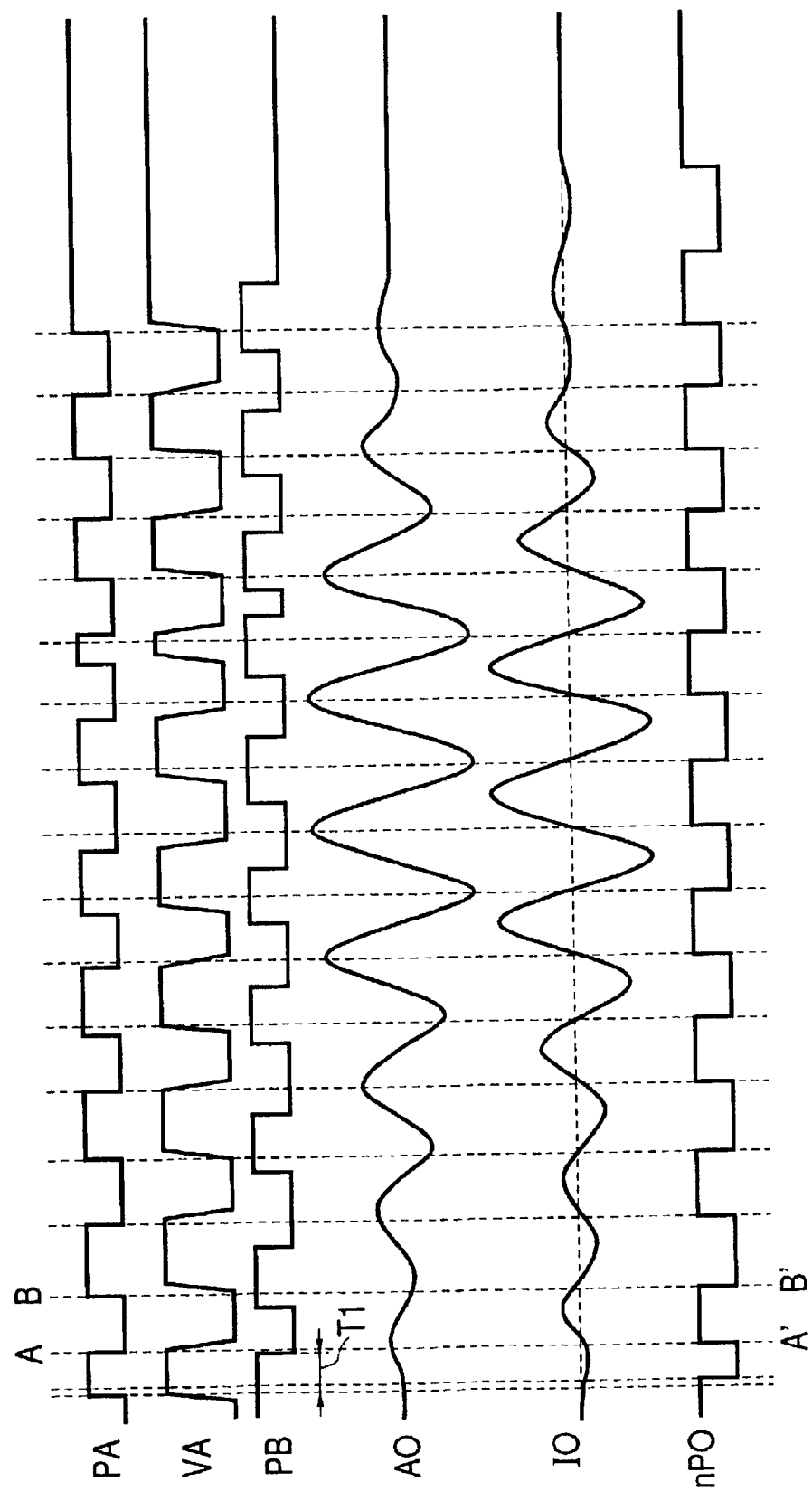
FIG. 4 is a timing chart showing waveform of each portion of FIG. 3.

In FIG. 3, a buffer 12 is used in place of the inverter 8 shown in FIG. 1, and the buffer 12 outputs a signal nPO obtained by reversing the signal PO of FIG. 1. FIG. 4 is a timing chart showing waveform in each portion in this case.

In this case, when an output signal from the PID calculation means 11 during starting up is in a positive state, the structure is arranged such that the phase of the signal nPO is delayed by an amount equal to a value obtained by adding a value corresponding to the predetermined time period T1. When the vibration is increased in the shortest time, a signal edge of the signal nPO becomes the limit. For that reason, the vibration amplitude is adapted to increase in a short time and to reach the target vibration amplitude in the shortest time. When the target vibration amplitude is approached, the phase of the signal PA continuously advances and the vibration amplitude is controlled by the target vibration amplitude.

Thus, on setting the vibration amplitude to 0, the delay from the phase of the signal nPO of the buffer 12 becomes less, and the signal PA will finally become a signal with the same phase as the signal nPO, and the vibration is attenuated in the shortest time.

Also, when the vibration amplitude has become smaller than the predetermined vibration amplitude as described above, the signal levels of the signal PA and the signal PB are fixed (in the present embodiment, the signal PA is in a high level, and the signal PB is in a low level) and thereafter, no excitation is adapted to be performed.

Figure 5:
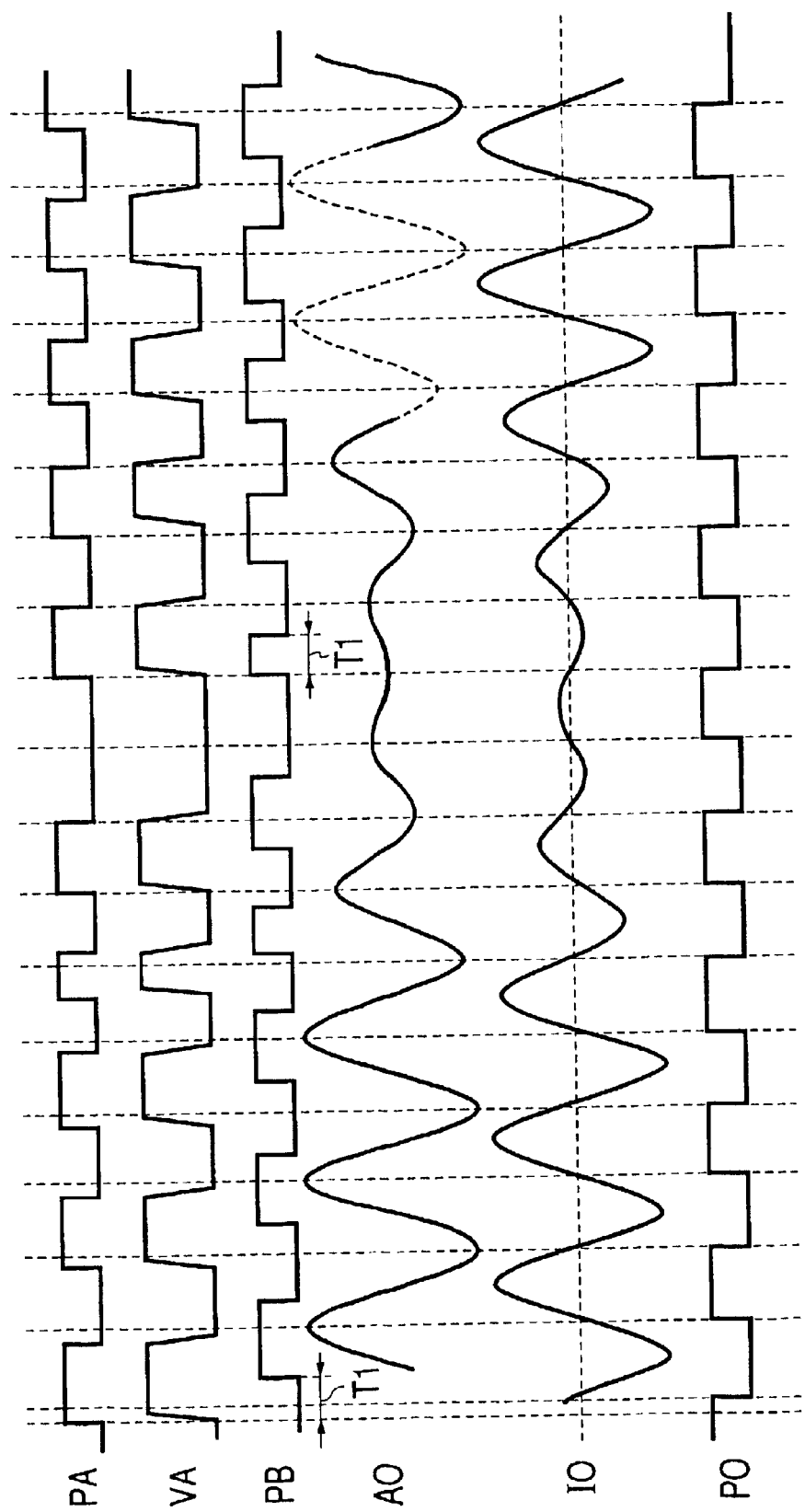
FIG. 5 is a timing chart showing waveform of each portion involving reversion according to the first embodiment.

Also, FIG. 5 is a timing chart showing an operation when switching a moving direction of a movable member (not shown) to be driven by a vibration type actuator (not shown) through the use of a control circuit in the block diagram of FIG. 3. On switching the direction, an operation for setting the vibration amplitude to 0 once is performed, and after the vibration amplitude has become smaller than the predetermined vibration amplitude, the signal PB is reversed, and the vibration amplitude is again controlled to the target vibration amplitude.

(Second Embodiment)

Figure 6:
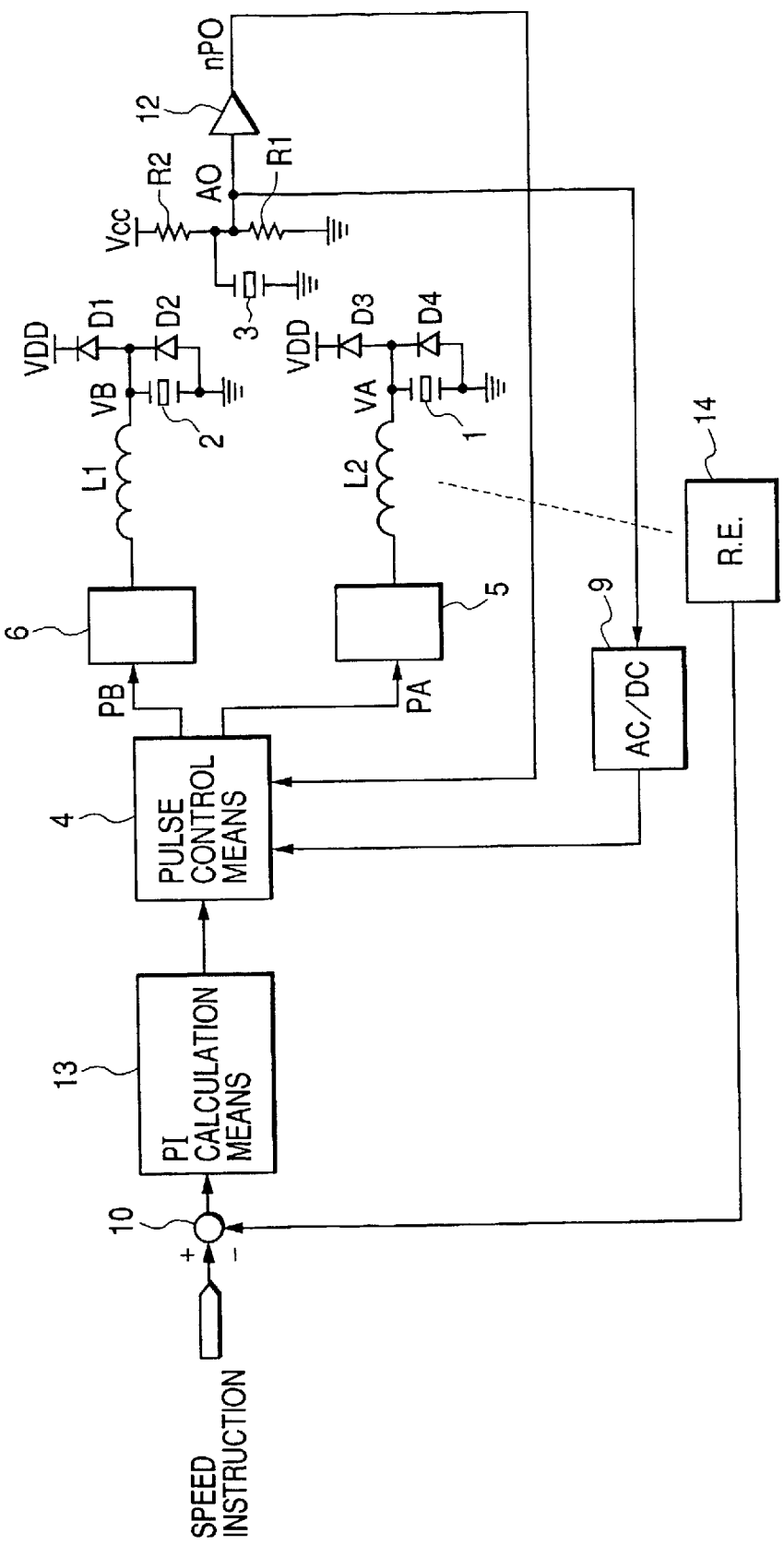
FIG. 6 is a block diagram showing a second embodiment.

FIG. 6 is a block diagram showing a second embodiment.

In FIG. 6, reference numeral 13 denotes a PI calculation means for PI calculating a result obtained by comparing a velocity command from command means (not shown) with velocity information from a rotary encoder 14 to be described later through the use of comparison means 10; and 14, a rotary encoder for detecting moving velocity of a movable member (not shown) which moves (rotates) by means of a vibration type actuator (not shown) for operating by applying AC voltage to piezo-electric elements 1, 2. Hereinafter, with reference to the block diagram, the description will be made of an operation.

In the first embodiment described above, a command concerning vibration amplitude of a vibration member (not shown) has been issued from command means (not shown), but in the present embodiment, a velocity command is issued. In order to perform an acceleration operation at high speed, it is necessary to increase the vibration amplitude of the vibration member up to the vibration amplitude corresponding to the target velocity at high speed.

It is the aim of the present embodiment to shorten the acceleration time by directly controlling the vibration in response to a velocity difference.

Also, while in the first embodiment described above, PID calculation has been made, in the present embodiment, PI calculation is made. However, in accordance with the characteristics, in addition to calculations and the like based on PID calculation, PD calculation and fuzzy control, and data conversion means using a simple data table may be used. Also, unlike the first embodiment, in the present embodiment, the output from the half bridges 5 and 6 supplies driving voltage to the piezo-electric elements 1 and 2 through inductor elements L1, L2, and further, through the use of diodes D1, D2, D3 and D4, the driving voltage is clipped between voltage VDD level and GND level. This cuts back on rush current through the use of the inductor elements L1 and L2 to lighten a burden on the half-bridges 5 and 6, and restrains fluctuations in the magnitude of the driving force by limiting the voltage by means of the diodes.

In this case, by inserting the inductor element, one problem arises. It is a delay in phase between the signals PA and PB and voltage VA and VB. Since in the first embodiment, there have existed no inductor elements L1 and L2, the phase of the driving voltage could be directly controlled on the basis of the phase of an output signal from the current detection amplifier 7, but in the present embodiment, it is necessary to set the phase of the signals PA and PB in consideration of a delayed amount in phase of the inductor element.

Further, in the present embodiment, output voltage from the piezo-electric element 3 is directly inputted into the buffer 12 without the aid of the current detection amplifier, and the vibration displacement itself is detected in contrast to the first embodiment in which a change in vibration displacement has been detected, and therefore, the signal nPO is a signal whose phase is delayed by 90° from the first embodiment. For the reason, in addition to the phase delay caused by the inductor elements L1 and L2, the 90° delayed amount of the signal nPO must be also taken into consideration. Therefore, it is necessary to advance the signal by these delayed amounts. Since this amount to be advanced is smaller than 180°, the nPO signal is reversed to advance the phase by 180°, and is delayed from here.

Also, as regards delay caused by the inductor elements L1 and L2, if the actual delayed amount is detected by directly detecting the phase in voltage VA and VB, it will be possible to avoid the effects of variations in characteristics of the inductor elements L1 and L2 and the piezo-electric elements 1 and 2. In other words, a relative phase shift amount of the voltage VA is calculated, and the signal PA is shifted by the same amount as it in the same direction, whereby the effects of the inductor elements L1 and L2 due to delayed amount can be avoided. Also, as regards a time period T1 corresponding to a phase 90° between the vibration displacement and its change, if the driving voltage period is detected and a quarter thereof is defined as time of 90°, a delay corresponding to at least one period of the driving voltage will occur, but an actual change in vibration characteristics can be reflected.

Figure 10:
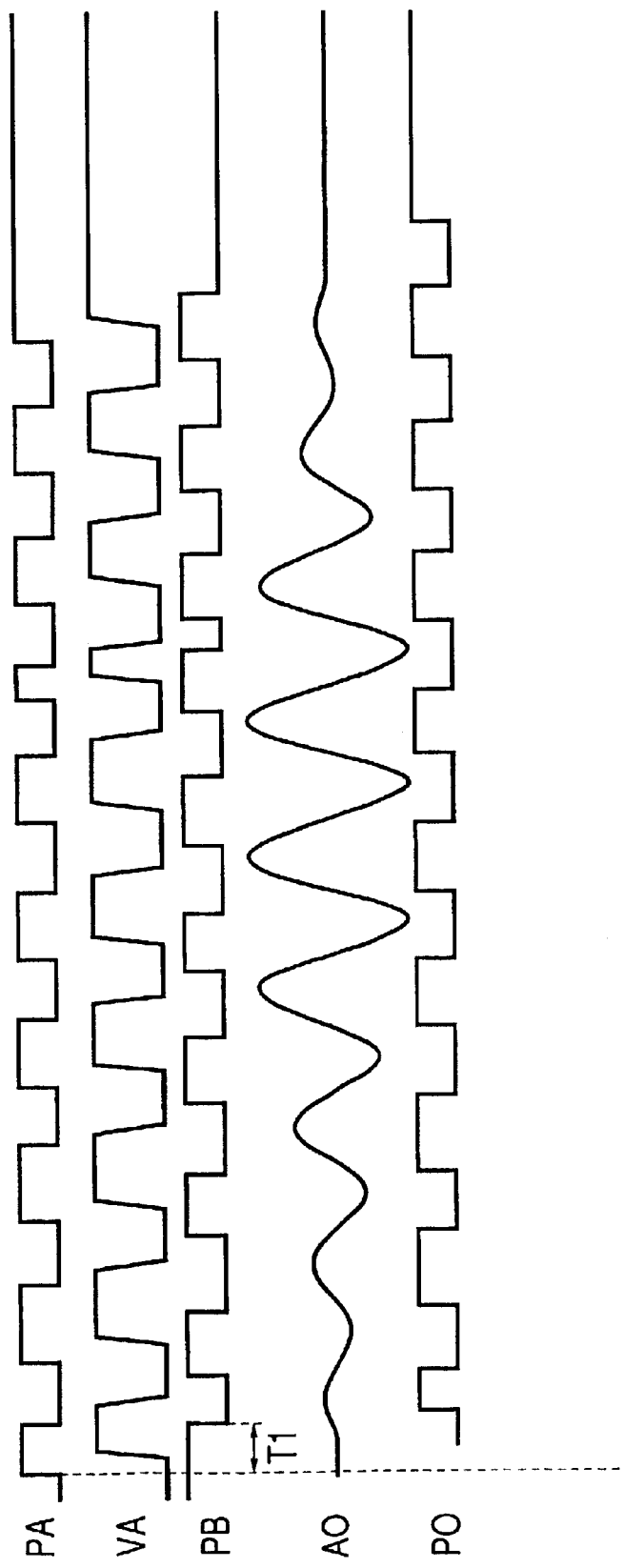
FIG. 10 is a timing chart showing waveform in each portion according to the second embodiment.

FIG. 10 shows signal waveform in each portion. The signal (voltage) VA is a temporally delayed signal from the signal PA under the influence of the inductor element L2. Also, the signal VA has trapezoid-shaped waveform, and the waveform is clipped by means of the diodes D3 and D4.

(Third Embodiment)

Figure 7:
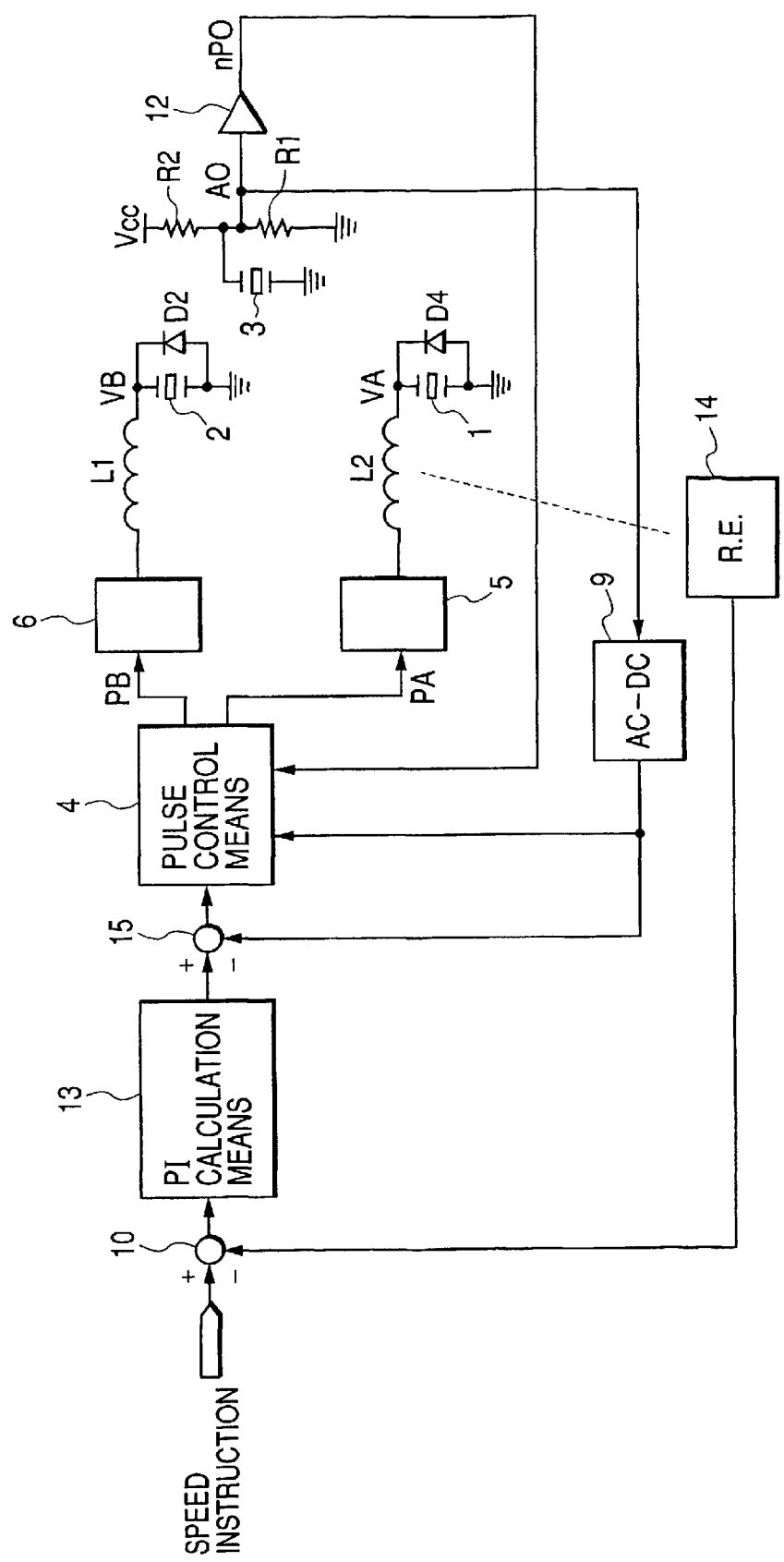
FIG. 7 is a block diagram showing a third embodiment.

FIG. 7 is a block diagram showing a third embodiment.

In the second embodiment described above, the output signal from the PI calculation means 13 has been directly inputted into the pulse control means 4, and a temporal shift of the signal PA from the signal nPO, which is a vibration detection signal, has been set. In contrast to this, the output signal from the PI calculation means 13 is defined as a vibration amplitude command, amplitude information on the output signal from the piezo-electric element 3 which has been detected by the AC-DC conversion means 9 is compared through the use of the comparison means 15, and on the basis of this comparison result, the temporal shift of the PA signal from the signal nPO, which is a vibration detection signal, is set.

Also, although in the second embodiment, the waveform of the driving voltage has been clipped in a trapezoid shape by means of four diodes D1, D2, D3 and D4, in the present embodiment, the diodes D1 and D3 are deleted, and the waveform of the driving voltage is caused to become half-wave rectification waveform. Including the second embodiment, when the diode is inserted, the following effect is given.

When pulse waveform having any phase is inputted into the inductor elements L1 and L2, there is a problem that voltage amplitude of the voltage VA on VB is not stabilized, but a desired-excitation force cannot be supplied to the piezo-electric elements 1 and 2 by means of filter effect caused by electrostatic capacity of the inductor elements L1 and L2 and the piezo-electric elements 1 and 2. When the diode is connected, however, the driving waveform is stabilized, and a change in the driving voltage is prone to be predicted even for an abrupt change in phase. Therefore, it is easy to control the excitation force. Since, however, the voltage amplitude of the signal (voltage) VA and the signal (voltage) VB changes depending upon the pulse width of the signal PA and the signal PB because of the deletion of the diodes D2 and D4, the excitation force is to change. For the reason, it is necessary to take into consideration not only excitation timing but also the excitation force.

In a mode of the present embodiment, since the fluctuation in the voltage amplitude is less than when the diode is not inserted, if a relationship between the pulse width and the excitation force is determined in advance, it will be possible to correct. If you look at it from another angle, according to the present mode, it may safely be said that flexible control can be made because both voltage amplitude and timing for generating voltage can be controlled.

Since the vibration amplitude is controlled at high speed as described above, the AC-DC conversion means 9 requires high-speed property. For the reason, there may be adopted a method of generating timing signals for a peak hold circuit and a sample hold circuit with timing with positive or negative maximum value of the input voltage to detect a positive or negative peak value for the input signal, or it may be possible to convert a result obtained by comparing a plurality of predetermined thresholds with the input voltage into a pulse signal for comprehensively determining the amplitude from these pulse width.

Also, by gradually widening the pulse width or gradually increasing the supply voltage in early stage of starting up, impulsive sound at the time of starting up may be reduced. Also, when the vibration amplitude in early stage of starting up is small, it may be possible to continue excitation at driving voltage of a predetermined frequency before predetermined vibration amplitude is reached, and after the vibration amplitude reaches the predetermined vibration amplitude, to control a temporal shift amount of the signal PA from the vibration detection signal nPO.

Also, in the second embodiment, the piezo-electric element 3 for vibration detection has detected standing vibration to be excited by the piezo-electric element 1, but if the structure is arranged such that vibration at a position where the phase of the vibration has been shifted by an amount corresponding to a time lag between the signals PA and PB and the signals VA and VB due to the inductors L1 and L2 is detected, the effects of the inductors L1 and L2 can be avoided. When S-phase 104-c is defined as a piezo-electric element for vibration detection in, for example, FIG. 9, vibration to be excited by A-phase 104a will be detected, but if an idle electrode 104d is used for vibration detection, vibration whose phase is shifted by 45° from the vibration phase of standing vibration to be excited by A-phase 104a will be able to be detected. By arranging the piezo-electric for vibration detection at which position on the vibration member as described above, it is possible to select temporal phase with respect to the vibration.

Figure 11:
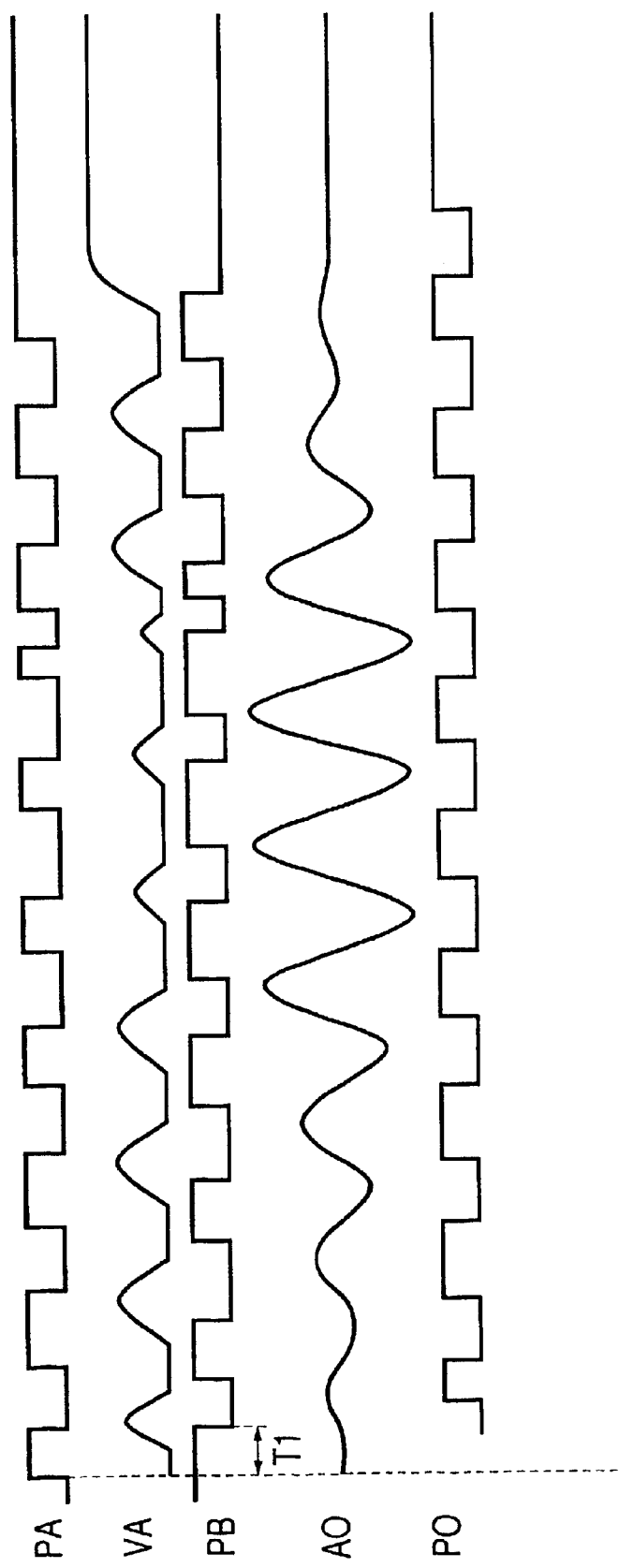
FIG. 11 is a timing chart showing waveform in each portion according to the third embodiment.

FIG. 11 shows waveform in each portion. A crest value of the signal VA varies depending upon the pulse width of the signal PA, and the lower waveform of the signal VA is clipped by the diode D4. Also, under the influence of the inductor element L2, the signal VA has a temporally delayed waveform from the signal PA.

What is claimed is:

1. A vibration type actuator apparatus which excites a vibration member to obtain a driving force by applying each of plural phases of driving voltage to respective different electro-mechanical energy conversion element portions for driving respectively, comprising:

a vibration detection circuit which detects vibration of the vibration member and forms a signal which indicates a periodic change in response to a vibration state; and a control circuit which controls timing in applying said driving voltage to said energy conversion element portion on the basis of timing in a periodic change of a detection output signal of said detection circuit.

2. The vibration type actuator apparatus according to claim 1, wherein said vibration state detection circuit forms a signal which in response to vibration displacement of a vibration member, changes with timing corresponding to timing of said displacement.

3. The vibration type actuator apparatus according to claim 1, wherein said control circuit applies said driving voltage to said energy conversion element portion with timing whose timing is advanced by 90° from timing of vibration displacement of the vibration member.

4. The vibration type actuator apparatus according to claim 1, wherein said control circuit applies said driving voltage to said energy conversion element portion with timing whose timing is delayed by 90° from timing of vibration displacement of the vibration member.

5. The vibration type actuator apparatus according to claim 1, wherein with reference to timing of vibration displacement of the vibration member, said control circuit applies said driving voltage to said energy conversion element portion with timing shifted by a predetermined time period from said timing.

6. A vibration type actuator apparatus which excites a vibration member to obtain a driving force by applying each of plural phases of driving voltage to respective different electro-mechanical energy conversion element portions for driving respectively, comprising:

a detection circuit which detects vibration of the vibration member to form a signal having waveform corresponding to the vibration displacement; and a control circuit which applies said driving voltage to said energy conversion element portion with a phase shifted by a predetermined phase from signal waveform from said detection circuit concerned.

7. The vibration type actuator apparatus according to claim 6, wherein said control circuit applies said driving voltage to said energy conversion element portion with a phase delayed by 90° from said signal waveform.

8. The vibration type actuator apparatus according to claim 6, wherein said control circuit applies said driving voltage to said energy conversion element portion with a phase advanced by 90° from said signal waveform.

9. A vibration type actuator apparatus which excites a vibration member to obtain a driving force by applying each of plural phases of driving voltage to respective different electro-mechanical energy conversion element portions for driving respectively, comprising: a circuit which determines timing with which said vibration member is excited in accordance with timing of vibration displacement of said vibration member.

10. A method of driving a vibration type actuator apparatus which excites a vibration member to obtain a driving force by applying each of plural phases of driving voltage to respective different electro-mechanical energy conversion element portions for driving respectively, comprising the steps of:

detecting vibration of said vibration member to form a signal indicating a periodic change in response to a state of vibration; and controlling timing in applying said driving voltage to said energy conversion element portion on the basis of timing of a periodic change of said signal.

11. The method of driving a vibration type actuator apparatus according to claim 10, wherein a step for forming said signal is to form a signal which in response to vibration displacement of the vibration member, changes with timing corresponding to timing of said displacement.

12. The method of driving a vibration type actuator apparatus according to claim 10, wherein a step for controlling said applied timing is to apply said driving voltage to said energy conversion element portion with timing having a phase advanced by 90° from timing of vibration displacement of said vibration member.

13. The method of driving a vibration type actuator apparatus according to claim 10, wherein a step for controlling said applied timing is to apply said driving voltage to said energy conversion element portion with timing having a phase delayed by 90° from timing of vibration displacement of said vibration member.

14. A method of driving a vibration type actuator apparatus which excites a vibration member to obtain a driving force by applying each of plural phases of driving voltage to respective different electro-mechanical energy conversion element portions for driving respectively, comprising the step of:

determining timing with which said vibration member is excited in accordance with timing of vibration displacement of said vibration member.

* * * * *

UNITED STATES PATENT AND TRADEMARK OFFICE
CERTIFICATE OF CORRECTION

PATENT NO. : 6,744,227 B2
DATED : June 1, 2004
INVENTOR(S) : Kataoka

It is certified that error appears in the above-identified patent and that said Letters Patent is hereby corrected as shown below:

Column 5,
Line 13, "controlling" should read -- controlling the vibration amplitude --.

Column 9,
Line 17, "the" (first occurrence) should read -- this --.

Column 10,
Line 15, "the" (second occurrence) should read -- this --;
Line 28, "the" should read -- this --; and
Line 62, "which" should read -- such --.

Signed and Sealed this

Twenty-fourth Day of January, 2006

JON W. DUDAS
*Director of the United States Patent and Trademark Office*